(12) United States Patent
Roberts

(10) Patent No.: US 6,560,132 B1
(45) Date of Patent: May 6, 2003

(54) SYSTEM FOR OBTAINING PHASE-GROUND VOLTAGES FROM A BROKEN DELTA VT VOLTAGE CONNECTION SYSTEM

(75) Inventor: Jeffrey B. Roberts, Viola, ID (US)

(73) Assignee: Schweitzer Engineering Labs., Inc., Pullman, WA (US)

(*) Notice: Subject to any disclaimer, the term of this patent is extended or adjusted under 35 U.S.C. 154(b) by 0 days.

(21) Appl. No.: 10/004,247

(22) Filed: Oct. 23, 2001

(51) Int. Cl.[7] .................................................. H02M 5/10
(52) U.S. Cl. .......................................... 363/153; 361/18
(58) Field of Search ................................. 363/153, 154, 363/156; 361/62, 68, 67, 18, 64, 82, 84, 48, 111, 119, 33; 307/127, 89, 90, 100

(56) References Cited

U.S. PATENT DOCUMENTS 4,297,740 A * 10/1981 Hagberg ..................... 361/67
4,453,191 A * 6/1984 Wilkinson ................... 361/84
6,188,552 B1 * 2/2001 Jaeschke et al. ............. 361/48

* cited by examiner

Primary Examiner—Rajnikant B. Patel
(74) Attorney, Agent, or Firm—Jensen & Puntigam, P.S.

(57) ABSTRACT

The system includes a plurality of voltage transformers in a protective relay for A, B and C-phase power system voltages, responsive to the secondary windings of corresponding voltage transformers for the power system, the secondary windings of the voltage system power transformers being connected in a broken delta arrangement. The primary windings of the relay voltage transformers are arranged in a broken delta configuration and connected to the secondary windings of the power system voltage transformers so that A-phase, B-phase and C-phase voltage are provided at the secondary windings of the relay voltage transformers. The three-phase voltages may then be summed to produce a residual voltage value.

5 Claims, 1 Drawing Sheet

SYSTEM FOR OBTAINING PHASE-GROUND VOLTAGES FROM A BROKEN DELTA VT VOLTAGE CONNECTION SYSTEM

TECHNICAL FIELD

This invention relates generally to obtaining residual voltage values in an ungrounded network which includes a "broken delta" voltage transformer (VT) connection, and more specifically concerns such a system which uses phase voltages obtained from the VT connection to determine the residual voltage values.

BACKGROUND OF THE INVENTION

Voltage transformers (VTs) for a three-phase power line can be wired into different primary/secondary configurations. The input (primary) side of the voltage transformers receives the three phases of the power line voltage signal, while the output (secondary) side produces reduced voltage values which are then applied to a protective relay or more particularly another set of voltage transformers in a protective relay, which reduce the voltage values from the power system VTs to levels which can be used by the processing circuitry in the protective relay.

One particular power system VT configuration is shown in FIG. 1 and is known as a "broken delta" VT. In a broken delta VT, the non-polarity end of the A-phase secondary winding 11 is connected directly to the polarity end of the secondary B-phase winding 12, while the non-polarity end of the B-phase secondary winding 12 is directly connected to the polarity end of the C-phase secondary winding 13. The polarity end of the A-phase winding and the non-polarity end of the C-phase winding are used directly from output lines 14 and 16 to produce a residual voltage 3 $V_0$ between them. This directly obtained 3 $V_0$ value is used to monitor and control the power on the power line. The 3 $V_0$ value is equal to the sum of the individual phase currents $V_A + V_B + V_C$.

The 3 $V_0$ output from the broken delta VT secondary connection, however, has a relatively high voltage value, i.e. approximately 360 volts nominal voltage. This level of voltage requires the VTs in the protective relay to have a higher voltage rating than normal, which increases expense of the system. Also, the protective relay operating with a 3 $V_0$ value from a broken delta VT connection cannot be used to check for blown potential fuses in the power system voltage transformers, since the 3 $V_0$ value from the broken delta VT remains the same, i.e. zero volts, both before and after a fuse blows. Still further, the broken delta VT connection with 3 $V_0$ values is typically limited to ground overcurrent protection and cannot be used for other protection schemes, such as phase-to-phase and three phase protection.

Hence, it would be desirable to be able to use a broken delta VT connection system with lower rated VTs in the protective relay and to be able to use such a system with other protection schemes besides ground overcurrent. Still further, it would be desirable to have a protection arrangement which could be responsive not only to a broken delta VT connection, but also other types of VT secondary arrangements, such as open delta VT connections.

SUMMARY OF THE INVENTION

Accordingly, the present invention is a system for obtaining phase-ground voltages from a broken delta voltage transformer arrangement used in an electric power system, comprising: a voltage transformer arrangement in a protective relay responsive to a power system voltage transformer arrangement having a broken delta secondary connection, wherein the primary windings of the relay voltage transformer arrangement are in a broken delta connection, matching the secondary connection of the power system voltage transformer arrangement, wherein the relay voltage transformer arrangement includes three separate secondary windings to produce phase voltage $V_A$, $V_B$ and $V_C$.

BEST MODE FOR CARRYING OUT THE INVENTION

Figure 1:
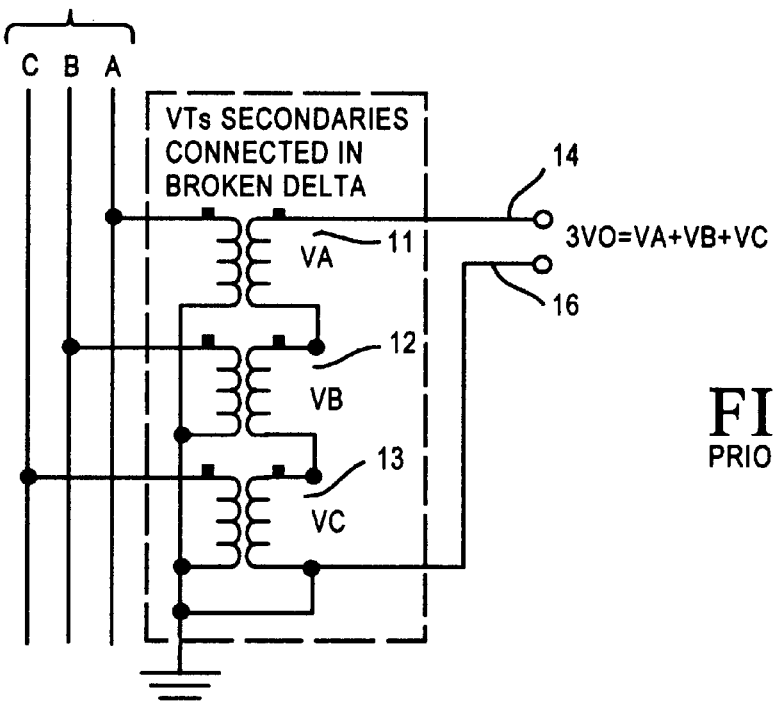
FIG. 1 is a diagram showing a prior art three-phase power system, with voltage transformers (VTs) connected in a broken delta configuration.
Figure 2:
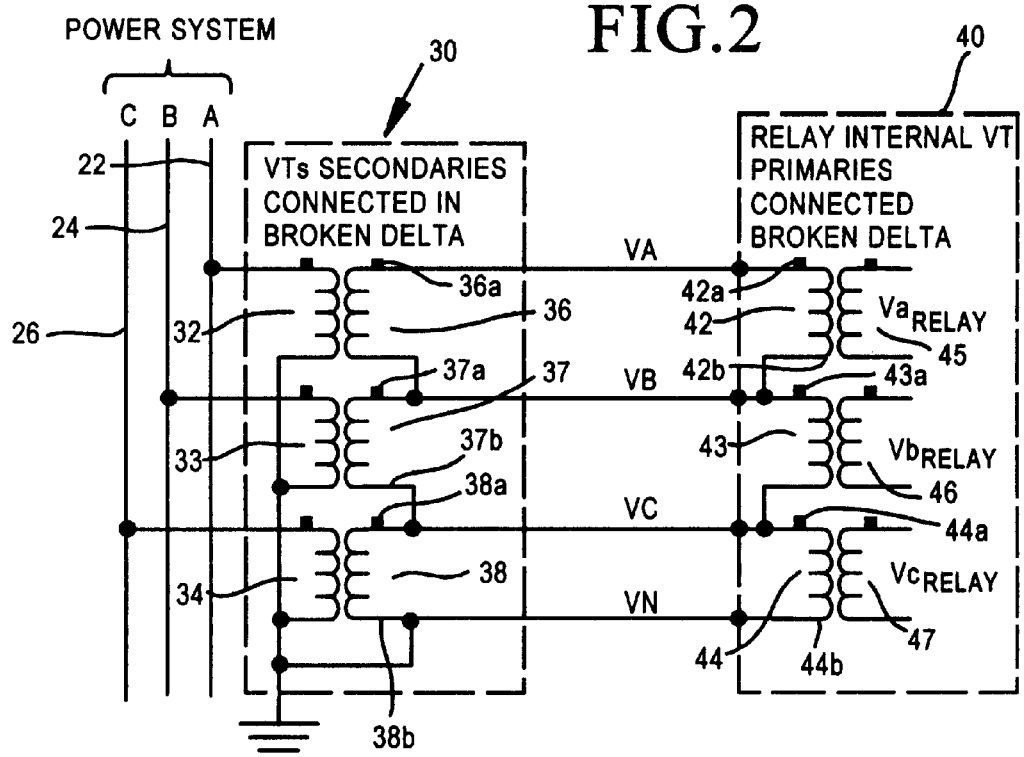
FIG. 2 is a circuit diagram showing a three-phase power system with a broken delta VT configuration with the individual phase voltages obtained for use in a protective relay.

FIG. 2 shows individual power lines 22, 24 and 26 in an electric power system for A-phase, B-phase and C-phase signals, respectively. Connected to the three power lines is a power system VT arrangement 30 comprising VTs for all three phases. The A-phase, B-phase and C-phase signals are applied, respectively, to input (primary) windings 32, 33 and 44 of VT arrangement 30. The secondary windings 36, 37 and 38 of VT arrangement 30 are connected in a conventional "broken" delta arrangement.

Secondary windings 36, 37 and 38 are connected to the input (primary) windings 42, 43 and 44 of voltage transformer arrangement 40 within a conventional protective relay (not shown). VT arrangement 40 comprises VTs for all three output voltages from VT arrangement 30.

Primary windings 42–44 of VT arrangement 40 are also connected in a broken delta arrangement. The secondary windings 45, 46 and 47 of VT arrangement 40 produce, respectively, $V_A$, $V_B$ and $V_C$, three-phase signals which are then used by the protective relay to implement various protection functions through different calculations.

The connection of primary windings 42, 43 and 44 of VT arrangement 40 mirrors the broken delta connection of secondary windings 36, 37, 38 of the power system VT. The polarity end 36a of secondary winding 36 is directly connected to the polarity end 42a of primary winding 42 of the relay VT. The polarity end 37a of secondary winding 37 is connected to the non-polarity end of secondary winding 36 and the polarity end 43a of primary winding 43, which is connected to the non-polarity end 42b of winding 42. The polarity end 38a is connected to the non-polarity end 37b of winding 37 and the polarity end 44a of primary winding 44. The non-polarity end 38b of secondary winding 38 is connected to the non-polarity end 44b of primary winding 44.

This completes the VT connection arrangement of the present invention by which a broken delta secondary of a power system VT is connected to a broken delta primary of a relay VT. As indicated above, the secondary windings produce $V_A$, $V_B$ and $V_C$ values which are used by the relay in its protection functions. In this structural arrangement, instead of the residual current value being measured directly between the upper and lower ends of the secondary windings for the power system VT, the individual phase voltages $V_A$, $V_B$, $V_C$ are developed at the secondary of a relay internal VT with a broken delta primary winding connection. The 3 $V_0$ residual voltage is then calculated from the three-phase values. Accordingly, the VTs for the relay can have a normal voltage rating instead of the higher rating, which was previously required in broken delta arrangements. In addition, a protective relay with the VT arrangement 40 of FIG. 2 can check for blown voltage potential fuses in the power system, since the calculated residual voltage will change following the fuse blow.

Since the three individual phase values $V_A$, $V_B$ and $V_C$ obtained from the broken delta connection, the relay can calculate sequence components (positive sequence, negative sequence and zero sequence). Also, the VT arrangement 40 can be used for both phase and ground directional control, even though the actual processing and calculations associated, respectively, with phase and ground directional elements are significantly different.

Existing conventional broken delta connections can be used in the system of the present invention. What is required is the addition of connections from the B-phase and C-phase polarity ends of the power system secondary windings to the corresponding primary windings on the relay VT. Phase-ground voltage measurements are thus added to the relay's capability; still further, the relay VT system can be connected either to a broken delta system such as shown in FIG. 2 or an open delta VT arrangement. Hence, the system is more diverse and flexible in operation than conventional systems using broken delta VTs.

Accordingly, a system has been disclosed which is responsive to a broken delta connection arrangement to provide a desired residual voltage value, while overcoming many of the traditional disadvantages of the broken delta arrangement.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for obtaining phase-ground voltages from a broken delta voltage transformer arrangement used in an electric power system, comprising:

a voltage transformer arrangement in a protective relay responsive to a power system voltage transformer arrangement having a broken delta secondary connection, wherein the primary windings of the relay voltage transformer arrangement are in a broken delta connection, matching the secondary connection of the power system voltage transformer arrangement, wherein the relay voltage transformer arrangement includes three separate secondary windings to produce phase voltages $V_A$, $V_B$ and $V_C$, respectively, from which a residual voltage can be determined in the protective relay.

2. A system of claim 1, wherein a non-polarity end of an A-phase primary winding of the relay voltage transformer primary winding is connected to the polarity end of a B-phase primary winding of the relay voltage transformer, wherein the non-polarity end of the B-phase primary winding of the relay voltage transformer is connected to the polarity end of a C-phase primary winding of the relay voltage transformer, wherein the non-polarity end of the C-phase primary winding of the relay voltage transformer is connected to the non-polarity end of the C-phase secondary winding of the power system voltage transformer, wherein the polarity end of the A-phase secondary winding is connected to the polarity end of the A-phase primary winding of the relay voltage transformer, wherein the non-polarity end of the A-phase secondary winding of the power system voltage transformer is connected to the polarity end of the B-phase secondary winding of the power system voltage transformer and the connection between the A-phase and B-phase primary windings of the relay voltage transformer, and wherein the non-polarity end of the B-phase primary winding of the power system voltage transformer is connected to the polarity end of the C-phase secondary winding of the power system voltage transformer and the connection between the B and C-phase primary windings of the relay voltage transformer.

3. A system of claim 1, including a summing element responsive to the three phase voltages at the secondary of the relay voltage transformer arrangement to produce a residual voltage value which can be used in protection functions of the protective relay.

4. A system of claim 1, wherein the relay voltage transformers can be used for both phase and ground directional control.

5. A system of claim 1, wherein the relay voltage transformer has a typical nominal voltage rating of approximately 300 V.

\* \* \* \* \*